(12) United States Patent
Ohira et al.

(10) Patent No.: US 6,575,859 B2
(45) Date of Patent: Jun. 10, 2003

(54) BELT TENSION ADJUSTING DEVICE

(75) Inventors: Kouya Ohira, Mie (JP); Masaki Egami, Mie (JP)

(73) Assignee: NTN Corporation, Osaka (JP)

( * ) Notice: Subject to any disclaimer, the term of this patent is extended or adjusted under 35 U.S.C. 154(b) by 65 days.

(21) Appl. No.: 09/785,469

(22) Filed: Feb. 20, 2001

(65) Prior Publication Data

US 2001/0021679 A1 Sep. 13, 2001

(30) Foreign Application Priority Data

Feb. 17, 2000 (JP) ........................................ 2000-039869

(51) Int. Cl.[7] ............................. F16H 7/12; C08L 79/04
(52) U.S. Cl. ...................... 474/135; 474/101; 525/133; 525/514
(58) Field of Search ................................ 474/133, 135, 474/109, 101; 524/514; 525/151, 133, 425, 180, 153; 384/292, 300

(56) References Cited

U.S. PATENT DOCUMENTS 5,129,739 A * 7/1992 Asai et al. .................. 384/292
5,900,453 A * 5/1999 Egami et al. ................ 524/514
6,102,820 A * 8/2000 Imaharu et al. ............. 474/109

FOREIGN PATENT DOCUMENTS

| JP | 7-71545 a | * | 3/1995 |
| JP | 10-184689 A | * | 7/1998 |
| JP | 11-166603 A | * | 6/1999 |

* cited by examiner

*Primary Examiner*—Marcus Charles
(74) *Attorney, Agent, or Firm*—Wenderoth, Lind & Ponack, L.L.P.

(57) ABSTRACT

A belt tension adjusting device has a stationary fulcrum shaft, an arm pivotally supported on the fulcrum shaft through a slide bearing formed of a synthetic resin, a tension pulley mounted on the arm at one end thereof for tensioning a belt, and a damper having a piston rod abutting the arm on the other end thereof. The tension pulley is pressed against the belt by pivoting the arm under the force of the piston rod, thereby adjusting the tension of the belt. The inner peripheral surface of said slide bearing, which is in slide contact with said fulcrum shaft, is formed so as to have a surface roughness RA of not more than 6.3 μm. The slide bearing is formed of a resin composition comprising 65–85 vol % of a thermoplastic polyimide resin, an aromatic polyether ketone resin or a mixture of the resins, and 15–35 vol % of a tetrafluoroethylene resin.

5 Claims, 1 Drawing Sheet

BELT TENSION ADJUSTING DEVICE

BACKGROUND OF THE INVENTION

This invention relates to a belt tension adjusting device for adjusting the tension in a power transmission belt such as a timing belt for an automotive engine.

Figure 1:
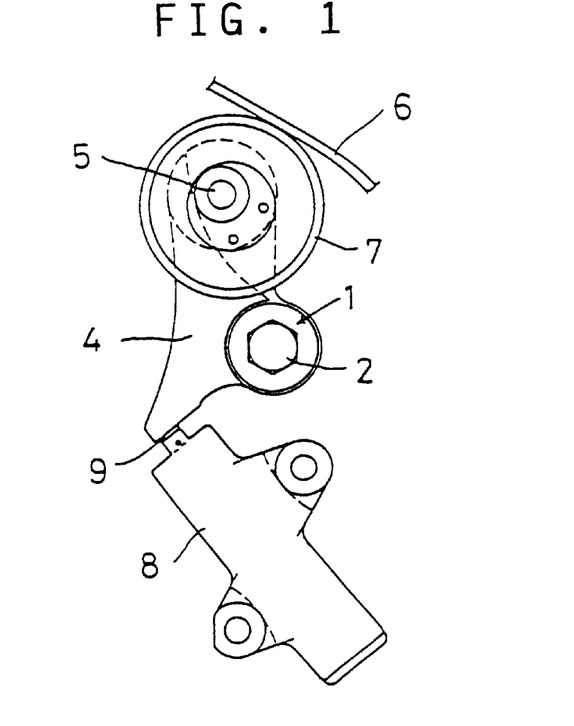
FIG. 1 is a front view of a belt tension adjusting device.
Figure 2:
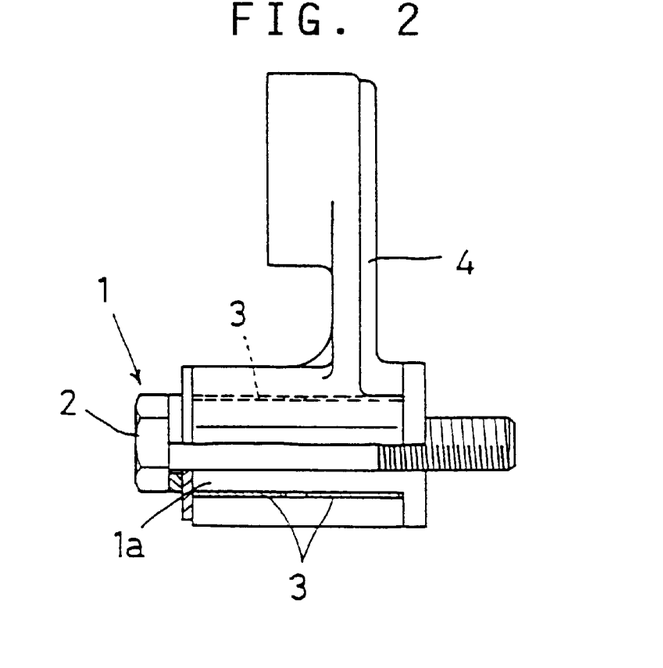
FIG. 2 is a partially cutaway sectional side view of the pulley arm showing how the fulcrum shaft is mounted.

In order to keep constant the tension in a power transmission belt such as a timing belt or an accessory machinery driving belt for an automobile, prolong the durability of such a belt, and minimize noise during belt travel, a belt tension adjusting device as shown in FIGS. 1 and 2 is generally used.

For example, with a belt tension adjusting device for a cam-driving timing belt in an automobile, a bifurcated arm 4 (also referred to as a pulley arm) is pivotally supported on a fulcrum shaft 1 having a collar 1a and fixed to e.g. an engine block by a bolt 2 through a cylindrical slide bearing 3. A tension pulley 7 is mounted on a rotary shaft 5 provided at one end of the arm 4 so as to engage a belt 6 used in a transmission mechanism (not shown).

The arm 4 has its other end in abutment with a piston rod 9 of a damper 8 provided with a well-known damper mechanism in a hydraulic cylinder. The arm 4 is pivotally supported by a predetermined resilient biasing force of the piston rod 9 to remove slackening of the belt 6 by pressing the tension pulley 7 against the belt and to give it a suitable tension so that the belt transmission mechanism can work more efficiently.

With the cylindrical slide bearing 3 of the belt tension adjusting device, which is in slide contact with the outer peripheral surface of the fulcrum shaft 1, the surface pressure applied to its sliding surface (or inner peripheral surface) is large, because the tension in the belt 6 and the biasing force from the damper 8 are transmitted through the arm 4 and small-amplitude pivoting force acts on the arm from the belt 6, so that a load changes. Also the moment load acting on the arm due to a change in the tension in the belt 6 is loaded at the contact portion between the fulcrum shaft 1 and the slide bearing 3. These loads act not uniformly over the entire contact portion but as uneven loads. Also, the slide bearing 3 is a part that is liable to suffer seizure and wear because with the engine heat transmitted, the sliding surface becomes hot and various factors act in a composite manner.

With such a slide bearing 3, even if it is made of a material superior in wear resistance, protrusions on the surface at the sliding portion tend to peel in relatively large units, and the peeled masses sometimes act as abrasives. Thus, wear of the slide bearing is promoted.

Also, for the material of the slide bearing, physical properties and wear resistance that prevent the bearing material from adhering to the fulcrum shaft 1 of the arm 4 are required. Heat resistance is also required to maintain mechanical strength at high temperature.

In order to satisfy these requirements, in conventional belt tension adjusting devices, slide bearings made of a condensed type aromatic polyimide resin, which has a good heat resistance, have been used.

But with a belt tension adjusting device in which the fulcrum shaft of the pulley arm is supported by a slide bearing made of a condensed type aromatic polyimide resin, since molding of a polyimide resin was not easy, it was difficult to mass-produce slide bearings and thus to achieve improved production efficiency and low cost.

With a reduction in size of belt tension adjusting devices, the surface pressure applied to the slide bearing of the fulcrum shaft increased so much as to make it impossible to sufficiently prevent wear of the slide bearing.

Furthermore, if a belt tension adjusting device is mounted in the engine room of an automobile, this means that the slide bearing is used at around from 80° C. to 150° C. Thus it was impossible to maintain required mechanical strength in such a heated state because bearing material tends to adhere to the fulcrum shaft and it tends to be worn.

An object of this invention is to provide a belt tension adjusting device in which even if the slide bearing is heated to a high temperature by heat of an automotive engine, it is less likely to get worn and the fulcrum shaft will not seize.

Another object of this invention is to provide a belt tension adjusting device in which the pivoting resistance of the arm is sufficiently small, the amount of wear of the slide bearing is small, and which has a slide bearing made of an injection-moldable synthetic resin to cope with the requirement for a low cost.

SUMMARY OF THE INVENTION

According to this invention, there is provided a belt tension adjusting device comprising a stationary fulcrum shaft, an arm pivotally supported on the fulcrum shaft through a slide bearing formed of a synthetic resin, a tension pulley mounted on the arm at one end thereof for tensioning a belt, a damper having a piston rod abutting the arm on the other end thereof, the tension pulley being pressed against the belt by pivoting the arm under the force of the piston rod, whereby adjusting the tension of the belt, characterized in that the inner peripheral surface of the slide bearing, which is in slide contact with the fulcrum shaft, is formed so as to have a surface roughness RA of not more than 6.3 μm.

In view of the working cost and attacking properties on the slide bearing, the surface roughness Ra should be 0.1–1.6 μm. The material of the fulcrum shaft is not particularly limited if it can withstand the use as the fulcrum shaft. But Ni-plated steel, which is superior in fretting and seizure resistance, and stainless steel or a ceramic material, which has good corrosion resistance, are preferable.

According to this invention, the slide bearing may be formed of a resin composition comprising 65–85 vol % of a thermoplastic polyimide resin expressed by the formula 2, an aromatic polyether ketone resin or a mixture of these resins, and 15–35 vol % of a tetrafluoroethylene resin.

Formula 2

(In the formula, X represents a direct bond or a group selected from the group consisting of hydrocarbon group having a carbon number of 1–10, hexafluorinated isopropylidene groups, carbonyl groups, thio groups and sulfonic groups, and R1–R4 represent hydrogen, lower alkyl groups having a carbon number of 1–5, lower alkoxy groups having a carbon number of 1–5, chlorine or bromine and may be identical to or different from one another. Y represents a quadrivalent group selected from the group consisting of an aliphatic group having a carbon number of 2 or more, a cycloaliphatic group, monocyclic aromatic group, condensed polycyclic aromatic group, and non-coupled polycyclic aromatic group obtained by coupling aromatic groups directly or through crosslinking members.)

Also, in the belt tension adjusting device, the resin composition may contain 2–15 vol % of an aromatic polyamide resin. Further, it may contain 1–5 vol % of graphite.

With the belt tension adjusting device of this invention, because the inner surface of the slide bearing for the fulcrum shaft has a roughness Ra of not more than 6.3 μm, and the slide bearing is formed of a resin composition in which one or both of a thermoplastic polyimide resin and an aromatic polyether ketone resin, which are good in heat resistance and injection moldability, and a tetrafluoroethylene resin, which is superior in sliding properties, are mixed in predetermined amounts, or a resin composition in which a predetermined amount of an aromatic polyimide resin and/or a predetermined amount of graphite is further added, even if the heat of the engine is conducted, so that the sliding surface of the fulcrum shaft portion becomes hot, seizure will not occur. A belt tension adjusting device is thus provided which is sufficiently small in the resistance during pivoting of the pulley arm, small in wear and has a long life.

Also, since the belt tension adjusting device is equipped with a slide bearing made of an injection-moldable synthetic resin, manufacturing efficiency is high and thus it can cope with the requirement for a low cost.

Other features and objects of the present invention will become apparent from the following description made with reference to the accompanying drawings, in which:

DETAILED DESCRIPTION OF THE PREFERRED EMBODIMENT

According to this invention, the inner periphery of the slide bearing for the fulcrum shaft of the belt tension adjusting device has such a surface roughness that Ra is not more than 6.3 μm. If Ra exceeds 6.3 μm, protrusions on the slide bearing surface at the sliding portion tend to peel in relatively large masses and the dropped powder works as an abrasive, so that initial wear progresses for a long period of time, thus promoting the wear of the slide bearing.

If the surface roughness of the slide bearing is extremely small, the surface pressure at the contact portion with protrusions on the surface of the fulcrum shaft increases. This may cause the wear to sharply progress. Thus, the surface roughness Ra of the inner peripheral surface of the slide bearing is preferably 0.1 to 6.3 μm.

The thermoplastic polyimide resin used in this invention has the structure expressed in [Chemical Formula 2], and is obtained by using as a diamine component an ether diamine expressed by [Chemical Formula 3] and dehydrating and cyclizing a polyamide acid obtained by reacting the ether diamine with one or more kinds of tetracarboxylic acid dianhydride. Among them, a typical one in which $R_1$ to $R_4$ are all hydrogen atoms is commercially available from Mitsui Chemical under the trademark "AURUM", and its manufacturing method is disclosed in Japanese patent publications 61-143478, 62-68817, and 62-86021.

Formula 3

(Wherein X represents a direct bond or a group selected from the group consisting of hydrocarbon groups having a carbon number of 1–10, hexafluorinated isopropylidene groups, carbonyl groups, thio groups and sulfonic groups.)

Since such a thermoplastic polyimide resin exhibits thermoplasticity while retaining heat resistance inherent to a polyimide resin, it can be molded efficiently by compression molding, injection molding, extrusion molding or any other melt molding method.

As specific examples of the diamine expressed by [Chemical Formula 3], the following can be cited. Bis(4-(3-aminophenoxy)phenyl]methane, 1,1-bis[4-(3-aminophenoxy)phenyl]ethane, 1,2-bis[4-(3-aminophenoxy)phenyl]ethane, 2,2-bis[4-(3-aminophenoxy)phenyl]propane, 2-[4-(3-aminophenoxy)phenyl]-2-[4-(3-aminophenoxy)-3-methylphenyl]propane, 2,2-bis[4-(3-aminophenoxy)-3-methylphenyl]propane, 2-[4-(3-aminophenoxy)phenyl]-2-[4-(3-aminophenoxy)-3,5-dimethylphenyl]propane, 2,2-bis[4-(3-aminophenoxy)-3,5-dimethylphenyl]propane, 2,2-bis[4-(3-aminophenoxy)phenyl]butane, 2,2-bis[4-(3-aminophenoxy)phenyl-1,1,1,3,3,3-hexafluoropropane, 4,4'-bis(3-aminophenoxy)biphenyl, 4,4'-bis(3-aminophenoxy)-3-methylbiphenyl, 4,4'-bis(3-aminophenoxy)-3,3'-dimethylbiphenyl, 4,4'-bis(3-aminophenoxy)-3,5-dimethylbiphenyl, 4,4'-bis(3-aminophenoxy)-3,3',5,5'tetramethylbiphenyl, bis[4-(3-aminophenoxy)phenyl] ketone, bis[4-(3-aminophenoxy)phenyl]sulfide, bis[4-(3-aminophenoxy)phenyl]sulfone, etc. They may be used alone or by mixing two or more kinds.

In such an amount that the melt flowability of the thermoplastic polyimide resin is not impaired, other diamines may be mixed with the thermoplastic polyimide resin.

As such diamines, the following can be cited: m-aminobenzylamine, p-aminobenzylamine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 3,4'-diaminobenzophenone, 4,4'-diaminobenzophenone, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 2,2-bis[4-(4-aminophenoxy)phenyl]propane, 4,4'-bis(4-aminophenoxy) biphenyl, 4,4'-bis(4-aminophenoxy)ketone, bis[4-(4-aminophenoxy)phenyl]sulfide, bis[4-(4-aminophenoxy) phenyl]sulfone, etc. These diamines may be mixed at the rate of 30% or under and preferably 5% or under.

The thermoplastic polyimide resin particularly preferably used in this invention is obtained by reacting the abovesaid diamine and a tetracarboxylic acid dianhydride in an organic solvent and dehydrating and ring-closing it.

The tetracarboxylic acid dianhydride is a dianhydride expressed by [Chemical Formula 4] (in the formula, Y is the same as Y in Chemical Formula 2).

Formula 4

As tetracarboxylic acid dianhydride expressed by [Chemical Formula 4], the following can be cited: ethylene-tetracarboxylic acid dianhydride, 1,2,3,4-buthanetetracarboxylic acid dianhydride, cyclopentanecarboxylic acid dianhydride, pyromellitic acid dianhydride, 3,3',4,4'-benzophenonetetracarboxylic acid dianhydride, 2,2',3,3'-benzophenonetetracarboxylic acid dianhydride, 3,3',4,4'-biphenyltetracarboxylic acid dianhydride, 2,2',3,3'-biphenyltetracarboxylic acid dianhydride, bis(3,4-dicarboxyphenyl)ether dianhydride, bis(3,4-dicarboxyphenyl)sulfone dianhydride, 1,1-bis(2'p-dicarboxyphenyl)ethane dianhydride, bis(2,3-dicarboxyphenyl)methane dianhydride, bis(3,4-dicarboxyphenyl)methane dianhydride, 2,3,6,7-naphthalenetetracarboxylic acid dianhydride, 1,4,5,8-naphthalenetetracarboxylic acid dianhydride, 1,2,5,6-naphthalenetetracarboxylic acid dianhydride, 1,2,3,4-benzenetetracarboxylic acid dianhydride, 3,4,9,10-perylenetetracarboxylic acid dianhydride, 2,3,6,7-anthracenetetracarboxylic acid dianhydride, 1,2,7,8-phenanthrenetetracarboxylic acid dianhydride, 4,4'-(p-phenylenedioxy)diphthalic acid dianhydride, 4,4'-(m-phenylenedioxy)diphthalic acid dianhydride, etc. These tetracarboxylic acid dianhydrides may be used singly or in combination.

As thermoplastic polyimide resins that satisfy the above-mentioned conditions, one expressed by [Chemical Formula 5] can be named.

Formula 5

(Wherein X represents a direct bond or a group selected from the group consisting of the following:

$R_1$ to $R_4$ represent hydrogen, lower alkyl group having a carbon number of 1 to 5, lower alkoxy group having a carbon number of 1 to 5, chlorine or bromine and may be identical to or different from each other. Y represents a quadrivalent group selected from the group consisting of the following:

-continued

The tetrafluoroethylene resin (hereinafter abbreviated as PTFE) used in this invention may be powder for molding or fine powder for a solid lubricant. With mixed powder containing both of them, more favorable results are obtained.

As commercial products of PTFE, KTL610 by KITAMURA, TEFLON 7J, TLP-10 by Mitsui-Dupont Fluorochemical, FLUON G163 by ASAHI Glass, POLYFLON M15, POLYFLON PTFE, L5 by DAIKIN KOGYO, Hostaflon TF9205 by Hoechst can be cited. Also, it may be a PTFE modified by alkylvinylether.

In this invention, the content of the tetrafluoroethylene resin should be limited to 15–35 vol % because if less than 15 vol %, lubricating properties of the resin composition worsens and if over 35 vol %, its moldability and mechanical properties worsen. In view of these tendencies, more preferable content is 20–30 vol %.

Next, the aromatic polyether ketone resin (hereinafter abbreviated as PEK) used in this invention is a polymer consisting of repeating units expressed in [Chemical Formula 6], or a copolymer obtained by polymerizing the repeating units expressed in [Chemical Formula 7] so that the properties inherent to PEK will not be lost.

Formula 6

Formula 7

As commercially available products of such PEK, PEEK made by VICTREX and expressed by Formula 8, PEK made by VICTREX and expressed by Formula 9, and Ultrapek made by BASF and expressed by Formula 10 can be sited. Besides these commercially available products, it can also be manufactured by known method as described in patent publication 54-90296.

Formula 8

Formula 9

Formula 10

The aromatic polyimide resin used in this invention is a fiber formed of a resin having the repeating units shown below and it includes meta-family ones expressed in [Chemical Formula 11] and para-family ones expressed in [Chemical Formula 12]. As commercially available products of the meta-family aromatic polyamide resin, NOMEX made by Dupont-Toray-Kevlar and CONEX made by TEIJIN can be sited.

As commercially available products of the para-family aromatic polyamide resin, KEVLAR made by Dupont-Toray-Kevlar, TWARON by Japan Aramid, and Technora Made by TEIJIN can be cited.

Formula 11

(meta-family)

Formula 12

(para-family)

As the aromatic polyamide resin used in this invention, a fibrous one is preferable, and further the abovementioned para-family one is preferable. This is because a fibrous one is less likely to drop off the substrate than a bulky one, and a para-family one is superior in heat resistance.

As such a fibrous aromatic polyamide resin, one having a fiber length of 0.15–3 mm and an aspect ratio of 10–230 is preferable. This is because if the fiber length is less than 0.15 mm, the wear resistance will be insufficient, and if over 3 mm, it will not disperse into the composition well. In view of such tendencies, the more preferable fiber length of the aromatic polyamide resin is 0.15–1.5 mm.

If the aspect ratio of the fiber is less than 10, it will be close to a powder form, so that the improvement in wear resistance will be insufficient. Fiber with an aspect ratio over 230 will not disperse uniformly in the composition.

The content of the aromatic polyamide resin used in this invention should be 2–15 vol %. If less than 2 vol %, there will be no improvement in wear resistance, and if over 15 vol %, moldability of the resin composition will worsen, or the wear resistance of the molded member will not reach the desired degree.

The graphite used in this invention may be natural or man-made. While the average particle diameter is not particularly limited, 1–50 μm is preferable and about 10 μm is more preferable. As such graphite, ACP made by Japan Graphite, KS-6, KS-10, KS-25 and KS-44 made by LONZA can be cited.

The content of the graphite used in this invention should be 1–5 vol %. If less than 1 vol %, there will be no effect in improving lubricating properties, and if over 5 vol %, the graphite, which is hard compared with the base resin, PTFE and Aramid fiber, will behave as an abrasive, so that the wear resistance will worsen.

As a method of mixing various additives to the thermoplastic polyimide resin and polyether ketone resin, a well-known mixing method may be used. To the respective resin, various kinds of additives may be mixed one by one or all at once by use of such a mixer as a Henschel mixer, ball mill or tumbler mixer, and further the mixture is fed to an injection molder or a melt extrusion molder (e.g. twin-screw extruder), which are good in melt-mixing properties. They may be melt-mixed using a hot roller, kneader, Banbury mixer, or melt extruder beforehand.

In order to mold the resin composition into a slide bearing, any of the extrusion molding, injection molding, compression molding, vacuum molding, blow molding and foaming molding can be employed. But injection molding is preferable to meet the requirement for a low cost.

After the resin composition has been melted and mixed, it may be ground in a jet mill, a freeze pulverizer, etc., classified to a desired particle diameter, if necessary, and painted by fluidized immersed painting or electrostatic powder coating. The powder may be dispersed in a solvent for spray painting or immersion painting, and then the painted surface may be finished to a required surface roughness.

With the thermoplastic polyimide resin composition used in this invention, it is possible to improve the sliding properties and mechanical strength by heat-treating and crystallizing it after it has been mixed and formed into a cylindrical slide bearing. As for the heat treatment conditions, it should be heated for 0.5–24 hours at 220–340° C.

Or a resin composition may be used in which crystallization progresses without heat treatment. As such a resin composition, a mixture of a thermoplastic polyimide resin, carbon black, a bisimide compound and polyarylether ketone resin disclosed in Japanese patent publication 9-188813 can be used.

Also, in order to improve water absorbing properties, moldability, mechanical properties or sliding properties of the thermoplastic polyimide resin, it may be polymer-alloyed with a polyether ketone resin, polyetherimide resin, polyethersulfone, etc. In particular, as a resin mixed to improve the smoothness and sliding properties of the surface of the molded article, a polyether ketone resin is preferable.

In this invention, various additives may be added to a resin composition whose major component is a thermoplastic polyimide resin or a polyether ketone resin. So long as the contents are such not to impair the effect of this invention, additives generally applicable to a synthetic resin, such as release agents, flame-retardants, antistatic agents, weather resistance improvers, antioxidants, colorants, industrial lubricants may be added.

For example, in order to reinforce the mechanical strength of the resin composition or improve moldability, the following may be added: such minerals as calcium carbonate, talc, clay and mica; such inorganic whiskers as titanium oxide whisker, potassium titanate whisker, aluminum borate whisker and calcium sulfate whisker; such inorganic fibers such as glass fiber, silicon nitride fiber, asbestos, quartz wool and metallic fiber; ones formed by weaving them into fabrics; carbon black, carbon fiber, polyamide-imide resin, polyetherimide resin, polyether sulfone resin, condensed type aromatic polyimide resin, polyoxy benzoyl polyester resin, polybenzoimidazol e resin, liquid crystal resin and molten fluororesins such as PFA, FEP, ETFE, and EPE.

Boron nitride, molybdenum disulfide, tungsten disulfide, etc. may be added. In order to improve thermal conductivity of the lubricative resin composition, carbon fiber, metallic fiber, graphite powder, zinc oxide, etc. may be added.

The slide bearing for the fulcrum shaft according to this invention, which is formed from the abovesaid materials, is not limited in shape. Any suitable form may be adopted according to peripheral devices and the housing.

EXAMPLES

Raw materials for forming the slide bearing for the fulcrum shaft in the belt tension adjusting devices of Examples and Comparative Examples are collectively listed below. Abbreviations used in the Tables are shown in brackets.
(1) thermoplastic polyimide resin (TPI) AURUM #450 made by Mitsui Chemical
(2) aromatic polyether ketone (PEK) PEEK 150P made by VICTREX
(3) tetrafluoroethylene resin (PTFE) KTL610 made by KITAMURA
(4) fibrous para-family aromatic polyamide resin (ARF) TWARON Micro 1088 cut fiber made by Japan Aramid, fiber length: 0.25 mm
(5) graphite (GRP) graphite powder KS-6 made by LONZA
(6) carbon fiber (CF) KUREKA M101T made by KUREHA Chemical
(7) molybdenum disulfide ($MOS_2$) MOLYKOTE Z made by Dow Corning
(8) polyimide resin (Vespel) Vespel SP21 made by Dupont Examples 1–30, Comparative Examples 1, 2, 4–7, 9, 11, 12, 14–17, 19, 21, 22, 24–27, 29, 31–42, 44–47, 49

After raw materials have been mixed at the rates shown in Tables 1 or 2 using a Henschel mixer, the mixture was supplied to a twin-screw extruder. As for the melt-mixing conditions, the cylinder temperature was 400° C. for thermoplastic polyimide, and 380° C. for aromatic polyether ketone, and the screw revolving speed was 100 rpm for both. The pellets obtained by extruding and pelletizing under the above melt-mixing conditions were injection-molded under the below-mentioned predetermined temperature conditions at an injection pressure of 800 kgf/cm$^2$ (78.5 MPa) to obtain a cylindrical molded member having an outer diameter of 23 mm, inner diameter of 20 mm and height of 40 mm.

As for the temperature conditions during injection molding, for the thermoplastic polyimide, the resin temperature was 400° C. and the mold temperature was 200° C. whereas for the aromatic polyether ketone, the resin temperature was 380° C. and the mold temperature was 200° C.

For the thus obtained cylindrical molded members, the surface roughness (Ra) of the inner peripheral surface was adjusted to four levels of 0.2, 1.6, 6.3 and 8 μm by machining. For each of the cylindrical slide bearings obtained, durability was examined by the following method.

The relation between the surface roughness (Ra) of the inner peripheral surface of the slide bearing and the Example or Comparative Example numbers is as follows. As shown in Tables 1 and 2, Ra=0.2 μm in Examples 1–10 and Comparative Examples 1–10, Ra=1.6 μm in Examples 11–20 and Comparative Examples 11–20, Ra=6.3 μm in Examples 21–30 and Comparative Examples 21–30, and Ra=8 μm in Comparative Examples 31–50.

For the slide bearings of Examples and Comparative Examples, an endurance test for the fulcrum shaft portion of the belt tension adjusting device was conducted under the following conditions. The results are shown in Tables 3 and 4.

(I) Endurance Test for the Fulcrum Shaft Portion of the Belt Tension Adjusting Device The slide bearings of Examples 1–30, Comparative Examples 1, 2, 4–7, 9–12, 14–17, 19–22, 24–27, 29 42, 44–47, 49 and 50 were mounted on the pulley arm 4 shown in FIG. 2 and the pulley arm was mounted to the belt tension adjusting device shown in FIG. 1 by a known method. The durability of the fulcrum shaft portion of the belt tension adjusting device was tested in the following manner.

Each specimen was continuously pivoted for 120 hours at a temperature of 130° C. with a sliding surface pressure between the fulcrum shaft (which was formed of a material which was Ni-plated SCM440 and in which the surface roughness (Ra) of the outer peripheral surface was 0.7 μm) and the fulcrum shaft bearing of 5 MPa, a runout width around the fulcrum shaft (on a circumference having a diameter of 40 mm) of 0.4 mm, and a pivoting speed of 105 cycles per second (Hz) to examine (a) the amount of adhesion of bearing material to the fulcrum shaft, (b) the amount of wear of the slide bearing and (c) the revolving state of the fulcrum shaft.

For the evaluation (indicated in the Tables) for test items (a) and (b), those having the measured value on a surface roughness meter of 50 μm or under are indicated by ○, those having the measured value of 50–100 μm are indicated by Δ, and those having the measured value of 100 μm or over are indicated by ×.

For the evaluation (indicated in the Tables) of test item (c), those having a small revolving resistance are indicated by ○, those in which a revolving resistance exists but the fulcrum shaft can be easily pulled out of the slide bearing are indicated by Δ, and those in which the revolving resistance is too large to pull the fulcrum shaft out of the slide bearing are indicated by ×.

Comparative Examples 3, 8, 13, 18, 23, 28, 43, 48

For these Comparative Examples, too, we tried to dry-mix, melt, pelletize and injection-mold the raw materials in the same manner as in Example 1 to form molded members. But for Comparative Examples 3, 13, 23, 43, during injection molding, no uniform resin molded members were obtained, so that the evaluation test was not conducted. For Comparative Examples 8, 18, 28, 48, a bridge was formed at the material supply port of the twin-screw extruder, so that it was impossible to supply material to the twin-screw extruder.

Comparative Examples 10, 20, 30, 50

A polyimide resin sold in block form (Vespel SP21 made by Dupont) was cut to form the above molded members and the test (I) was conducted. The results are shown in Tables 3 and 4.

As will be apparent from the results of Table 4 (Comparative Examples 31–50), it is apparent that when the surface roughness (Ra) of the fulcrum shaft bearing was 8 μm, irrespective of the kind of the material (composition), the amount of wear of the slide bearing was large.

As will be apparent from the results of Tables 3 and 4, when the surface roughness (Ra) of the fulcrum shaft bearing was 0.2, 1.6 or 6.3 μm, wear of the fulcrum shaft bearing was large for TPI resin compositions to which no PTFE was added (Comparative Examples 1, 11, 21), TPI resin compositions to which was added a solid lubricant other than PTFE (Comparative Examples 4–7, 14–17, 24–27), TPI, PEK resin compositions in which the content of PTFE was out of the predetermined range (Comparative Examples 2, 8, 9, 12, 18, 19, 22, 28, 29), and resin compositions comprising other resin than any of the predetermined resins (Comparative Examples 10, 20, 30). Also, for Comparative Examples 6, 16, 26, in which CF was added, damage to the fulcrum shaft, which was the mating member in sliding, was observed.

For belt tension adjusting devices equipped with slide bearings comprising TPI resin compositions to which no PTFE was added (Comparative Examples 1, 11, 21, 41), and belt tension adjusting devices equipped with slide bearings comprising TPI, PEK resin compositions in which the content of PTFE was lower than the predetermined amount (Comparative Examples 2, 9, 12, 19, 22, 29, 46), no satisfactory results were obtained for any of the evaluation items (a), (b) and (c).

Furthermore, for belt tension adjusting devices equipped with slide bearings made of polyimide resin (Comparative Examples 10, 20, 30, 50), the revolving state of the fulcrum shaft was poor.

On the other hand, for belt tension adjusting devices equipped with slide bearings made of the predetermined resin compositions (Examples 1–30), when tested at 130° C., wear of the bearing was slight, no adhesion of bearing material to the fulcrum shaft or no seizure occurred, and the revolving state of the fulcrum shaft under high-temperature conditions was good. And with such belt tension adjusting devices, it was found that under high load and even under such conditions that the use of a condensed type aromatic polyimide (Comparative Examples 10, 20, 30, 50) was not feasible, they can maintain good characteristics.

According to this invention, by forming the inner peripheral surface of the slide bearing that is in slide contact with the fulcrum shaft of the belt tension adjusting device to a surface roughness (Ra) of not more than 6.3 μm, a belt tension adjusting device is provided in which wear of the slide bearing will hardly occur and the fulcrum shaft will never seize even if the sliding surface of the slide bearing is heated to a high temperature.

Also, a belt tension adjusting device is provided in which the pivoting resistance of the pulley arm is small and the amount of wear of the slide bearing is small, and its life is long. Also, the belt tension adjusting device is equipped with a slide bearing formed of an injection-moldable synthetic resin to cope with the requirement for a low cost.

If the slide bearing is formed of the predetermined resin composition, it will have improved heat resistance, seizure resistance, wear resistance and injection moldability. Thus, a belt tension adjusting device is provided in which the amount of wear is slight even when the slide surface of the slide bearing becomes hot under heat of the engine, and thus the slide bearing can support the fulcrum shaft without causing seizure.

In particular, if the resin composition forming the slide bearing contains a predetermined amount of an aromatic polyamide resin as an essential component, wear resistance and heat resistance improve sufficiently. If it contains a predetermined amount of graphite as an essential component, the slide bearing will be superior in wear resistance and low in the revolving resistance. Thus, a belt tension adjusting device can be obtained in which the above advantages are achieved reliably.

TABLE 1

|  |  | Example |  |  |  |  |  |  |  |  |  |
|---|---|---|---|---|---|---|---|---|---|---|---|
|  | Ra = 0.2 μm | 1 | 2 | 3 | 4 | 5 | 6 | 7 | 8 | 9 | 10 |
|  | Ra = 1.6 μm | 11 | 12 | 13 | 14 | 15 | 16 | 17 | 18 | 19 | 20 |
|  | Ra = 6.3 μm | 21 | 22 | 23 | 24 | 25 | 26 | 27 | 28 | 29 | 30 |
| content (vol %) | TPI | 85 | 65 | 53 | 50 | 73 | 65 | 70 | 65 | — | — |
|  | PEK | — | — | 22 | 20 | — | — | — | — | 85 | 69 |
|  | PTFE | 15 | 35 | 25 | 24 | 25 | 25 | 25 | 20 | 15 | 25 |
|  | ARF | — | — | — | 5 | 2 | 5 | 5 | 15 | — | 5 |
|  | GRP | — | — | — | 1 | — | 5 | — | — | — | 1 |
|  | CF | — | — | — | — | — | — | — | — | — | — |
|  | MoS$_2$ | — | — | — | — | — | — | — | — | — | — |
|  | Vespel | — | — | — | — | — | — | — | — | — | — |

TABLE 1-continued

|  |  | Comparative Example |  |  |  |  |  |  |  |  |  |
|---|---|---|---|---|---|---|---|---|---|---|---|
|  | Ra = 0.2 μm | 1 | 2 | 3 | 4 | 5 | 6 | 7 | 8 | 9 | 10 |
|  | Ra = 1.6 μm | 11 | 12 | 13 | 14 | 15 | 16 | 17 | 18 | 19 | 20 |
|  | Ra = 6.3 μm | 21 | 22 | 23 | 24 | 25 | 26 | 27 | 28 | 29 | 30 |
| content (vol %) | TPI | 100 | 95 | 50 | 85 | 85 | 85 | 85 | 50 | — | — |
|  | PEK | — | — | — | — | — | — | — | — | 95 | — |
|  | PTFE | — | 5 | 50 | — | — | — | — | 25 | 5 | — |
|  | ARF | — | — | — | 15 | — | — | — | 25 | — | — |
|  | GRP | — | — | — | — | 15 | — | — | — | — | — |
|  | CF | — | — | — | — | — | 15 | — | — | — | — |
|  | MoS$_2$ | — | — | — | — | — | — | 15 | — | — | — |
|  | Vespel | — | — | — | — | — | — | — | — | — | 100 |

TABLE 2

|  |  | Comparative Example (Ra = 8 μm) |  |  |  |  |  |  |  |  |  |
|---|---|---|---|---|---|---|---|---|---|---|---|
|  |  | 31 | 32 | 33 | 34 | 35 | 36 | 37 | 38 | 39 | 40 |
| content (vol %) | TPI | 85 | 65 | 53 | 50 | 73 | 65 | 70 | 65 | — | — |
|  | PEK | — | — | 22 | 20 | — | — | — | — | 85 | 69 |
|  | PTFE | 15 | 35 | 25 | 24 | 25 | 25 | 25 | 20 | 15 | 25 |
|  | ARF | — | — | — | 5 | 2 | 5 | 5 | 15 | — | 5 |
|  | GRP | — | — | — | 1 | — | 5 | — | — | — | 1 |
|  | CF | — | — | — | — | — | — | — | — | — | — |
|  | MoS$_2$ | — | — | — | — | — | — | — | — | — | — |
|  | Vespel | — | — | — | — | — | — | — | — | — | — |

|  |  | Comparative Example (Ra = 8 μm) |  |  |  |  |  |  |  |  |  |
|---|---|---|---|---|---|---|---|---|---|---|---|
|  |  | 41 | 42 | 43 | 44 | 45 | 46 | 47 | 48 | 49 | 50 |
| content (vol %) | TPI | 100 | 95 | 50 | 85 | 85 | 85 | 85 | 50 | — | — |
|  | PEK | — | — | — | — | — | — | — | — | 95 | — |
|  | PTFE | — | 5 | 50 | — | — | — | — | 25 | 5 | — |
|  | ARF | — | — | — | 15 | — | — | — | 25 | — | — |
|  | GRP | — | — | — | — | 15 | — | — | — | — | — |
|  | CF | — | — | — | — | — | 15 | — | — | — | — |
|  | MoS$_2$ | — | — | — | — | — | — | 15 | — | — | — |
|  | Vespel | — | — | — | — | — | — | — | — | — | 100 |

TABLE 3

| Test item (Ra = 0.2 μm) |  | (a) | (b) | (c) | Test item (Ra = 1.6 μm) |  | (a) | (b) | (c) |
|---|---|---|---|---|---|---|---|---|---|
| Example | 1 | ○ | ○ | ○ | Example | 11 | ○ | ○ | ○ |
|  | 2 | ○ | ○ | ○ |  | 12 | ○ | ○ | ○ |
|  | 3 | ○ | ○ | ○ |  | 13 | ○ | ○ | ○ |
|  | 4 | ○ | ○ | ○ |  | 14 | ○ | ○ | ○ |
|  | 5 | ○ | ○ | ○ |  | 15 | ○ | ○ | ○ |
|  | 6 | ○ | ○ | ○ |  | 16 | ○ | ○ | ○ |
|  | 7 | ○ | ○ | ○ |  | 17 | ○ | ○ | ○ |
|  | 8 | ○ | ○ | ○ |  | 18 | ○ | ○ | ○ |
|  | 9 | ○ | ○ | ○ |  | 19 | ○ | ○ | ○ |
|  | 10 | ○ | ○ | ○ |  | 20 | ○ | ○ | ○ |
| Comparative Example | 1 | X | X | X | Comparative Example | 11 | X | X | X |
|  | 2 | X | X | X |  | 12 | X | X | X |
|  | 3 | — | — | — |  | 13 | — | — | — |
|  | 4 | X | X | X |  | 14 | X | X | X |
|  | 5 | Δ | X | X |  | 15 | Δ | X | X |
|  | 6 | Δ | X | X |  | 16 | Δ | X | X |
|  | 7 | Δ | X | X |  | 17 | Δ | X | X |
|  | 8 | — | — | — |  | 18 | — | — | — |
|  | 9 | X | X | X |  | 19 | X | X | X |
|  | 10 | Δ | X | X |  | 20 | Δ | X | X |

(a) adhesion to fulcrum shaft
(b) wear of slide bearing
(c) revolving state of fulcrum shaft

TABLE 4

| Test item (Ra = 6.3 μm) | | (a) | (b) | (c) | Test item (Ra = 8 μm) | | (a) | (b) | (c) |
|---|---|---|---|---|---|---|---|---|---|
| Example | 21 | ○ | ○ | ○ | Comparative Example | 31 | Δ | X | Δ |
| | 22 | ○ | ○ | ○ | | 32 | Δ | X | Δ |
| | 23 | ○ | ○ | ○ | | 33 | Δ | X | Δ |
| | 24 | ○ | ○ | ○ | | 34 | Δ | X | Δ |
| | 25 | ○ | ○ | ○ | | 35 | Δ | X | Δ |
| | 26 | ○ | ○ | ○ | | 36 | Δ | X | Δ |
| | 27 | ○ | ○ | ○ | | 37 | Δ | X | Δ |
| | 28 | ○ | ○ | ○ | | 38 | Δ | X | Δ |
| | 29 | ○ | ○ | ○ | | 39 | Δ | X | Δ |
| | 30 | ○ | ○ | ○ | | 40 | Δ | X | Δ |
| Comparative Example | 21 | X | X | X | Comparative Example | 41 | X | X | X |
| | 22 | X | X | X | | 42 | X | X | X |
| | 23 | — | — | — | | 43 | — | — | — |
| | 24 | X | X | X | | 44 | X | X | X |
| | 25 | Δ | X | X | | 45 | Δ | X | X |
| | 26 | Δ | X | X | | 46 | Δ | X | X |
| | 27 | Δ | X | X | | 47 | Δ | X | X |
| | 28 | — | — | — | | 48 | — | — | — |
| | 29 | X | X | X | | 49 | X | X | X |
| | 30 | Δ | X | X | | 50 | Δ | X | X |

(a) adhesion to fulcrum shaft
(b) wear of slide bearing
(c) revolving state of fulcrum shaft

What is claimed is:

1. A belt tension adjusting device comprising a stationary fulcrum shaft, an arm pivotally supported on said fulcrum shaft through a slide bearing formed of a synthetic resin, a tension pulley mounted on said arm at one end thereof for tensioning a belt, a damper having a piston rod abutting said arm on another end thereof, said tension pulley being pressed against the belt by pivoting said arm under the force of said piston rod, whereby adjusting the tension of the belt, wherein:
    an inner peripheral surface of said slide bearing, which is in slide contact with said fulcrum shaft, is formed so as to have a surface roughness RA of not more than 6.3 μm, and
    said slide bearing is formed of a resin composition comprising 65–85 vol % of a thermoplastic polyimide resin expressed by formula 1 below, an aromatic polyether ketone resin or a mixture of said resins, and 15–35 vol % of a tetrafluoroethylene resin, Formula 1 wherein X represents a direct bond or a group selected from the group consisting of hydrocarbon group having a carbon number of 1–10, hexafluorinated isopropylidene groups, carbonyl groups, thio groups and sulfonic groups, $R_1$–$R_4$ represent hydrogen, lower alkyl groups having a carbon number of 1–5, lower alkoxy groups having a carbon number of 1–5, chlorine or bromine and may be identical to or different from one another, and Y represents a quadrivalent group selected from the group consisting of an aliphatic group having a carbon number of 2 or more, a cycloaliphatic group, monocyclic aromatic group, condensed polycyclic aromatic group, and non-coupled polycyclic aromatic group obtained by coupling aromatic groups directly or through crosslinking members.

2. The belt tension adjusting device as claimed in claim 1 wherein the surface roughness Ra of the inner peripheral surface of the slide bearing is 0.1–6.3 μm.

3. The belt tension adjusting device as claimed in claim 1, wherein said resin composition contains 1–5 vol % of graphite.

4. The belt tension adjusting device as claimed in claim 3, wherein said resin composition contains 2–15 vol % of an aromatic polyamide resin.

5. The belt tension adjusting device as claimed in claim 4, wherein said resin composition contains 1–5 vol % of graphite.

* * * * *

UNITED STATES PATENT AND TRADEMARK OFFICE
CERTIFICATE OF CORRECTION

PATENT NO. : 6,575,859 B2  Page 1 of 1
DATED : June 10, 2003
INVENTOR(S) : Kouya Ohira et al.

It is certified that error appears in the above-identified patent and that said Letters Patent is hereby corrected as shown below:

<u>Column 16,</u>
Line 33, change "claim 3" to -- claim 1 --.

Signed and Sealed this

Fourteenth Day of October, 2003

JAMES E. ROGAN
*Director of the United States Patent and Trademark Office*